US010320166B2

(12) United States Patent
Aro-Heinilä et al.

(10) Patent No.: US 10,320,166 B2
(45) Date of Patent: Jun. 11, 2019

(54) PROTECTION COVER FOR CONNECTING ELECTRIC AND/OR DATA COMMUNICATION CABLES TO SEVERAL LOCATIONS

(71) Applicant: GISTELE OY, Turku (FI)

(72) Inventors: Tapio Aro-Heinilä, Turku (FI); Juha Reidar Wermundsén, Sipoo (FI); Ari Korhonen, Turku (FI)

(73) Assignee: GISTELE OY, Turku (FI)

( * ) Notice: Subject to any disclaimer, the term of this patent is extended or adjusted under 35 U.S.C. 154(b) by 0 days.

(21) Appl. No.: 15/759,982

(22) PCT Filed: Sep. 6, 2016

(86) PCT No.: PCT/FI2016/050619
§ 371 (c)(1),
(2) Date: Mar. 14, 2018

(87) PCT Pub. No.: WO2017/046446
PCT Pub. Date: Mar. 23, 2017

(65) Prior Publication Data
US 2018/0261985 A1 Sep. 13, 2018

(30) Foreign Application Priority Data
Sep. 16, 2015 (FI) .................................. 20155664

(51) Int. Cl.
H02G 3/04 (2006.01)
F16G 13/16 (2006.01)
H02G 11/00 (2006.01)

(52) U.S. Cl.
CPC ........... *H02G 3/0475* (2013.01); *F16G 13/16* (2013.01); *H02G 11/006* (2013.01)

(58) Field of Classification Search
CPC ...... H02G 3/0481; H02G 3/04; H02G 3/0406; H02G 3/045; H02G 3/0462; H02G 3/0475;
(Continued)

(56) References Cited

U.S. PATENT DOCUMENTS 6,848,369 B1 2/2005 King et al.
2005/0029393 A1* 2/2005 Ikeda .................. H02G 11/006
242/615.3
(Continued)

FOREIGN PATENT DOCUMENTS

DE 10 2012 222916 A1 6/2014
WO 2011/000028 A1 1/2011

OTHER PUBLICATIONS

International Search Report, dated Dec. 2, 2016, from corresponding PCT/FI2016/050619 application.
(Continued)

Primary Examiner — Hoa C Nguyen
Assistant Examiner — Amol H Patel
(74) Attorney, Agent, or Firm — Young & Thompson

(57) ABSTRACT

According to one embodiment, the disclosure relates to a protection cover for connecting electric and/or data communication cables to several locations. The cover includes an installation space which enables the installation of cables in the cover. The installation space is defined by a plurality of interconnected protection blocks, which are adapted to move relative to each other by way of coupling elements thereof in such a way that the cover lends itself to bending, and the protection blocks enable the cables to be connected to several locations in such a way that to each location is connected an electric and/or data communication cable.

9 Claims, 2 Drawing Sheets

(58) Field of Classification Search
CPC .......... H02G 3/06; H02G 3/0608; H02G 3/24; H02G 3/26; H02G 3/34; F16G 13/16
See application file for complete search history.

(56) References Cited

U.S. PATENT DOCUMENTS

| | | | |
|---|---|---|---|
| 2009/0133609 A1* | 5/2009 | Nethken | A47B 21/02 |
| | | | 108/50.02 |
| 2011/0030190 A1 | 2/2011 | Larson et al. | |
| 2013/0008143 A1* | 1/2013 | Komiya | F16G 13/16 |
| | | | 59/78.1 |
| 2013/0161453 A1* | 6/2013 | Hsieh | H02G 3/0475 |
| | | | 248/73 |
| 2016/0290438 A1* | 10/2016 | Komiya | F16G 13/16 |
| 2018/0112739 A1* | 4/2018 | Della Fiora | F16G 13/16 |

OTHER PUBLICATIONS

FI Search Report, dated Feb. 24, 2016, from corresponding FI 20155664 application.

* cited by examiner

PROTECTION COVER FOR CONNECTING ELECTRIC AND/OR DATA COMMUNICATION CABLES TO SEVERAL LOCATIONS

TECHNICAL FIELD

The disclosure relates generally to a protection cover for connecting electric and/or data communication cables to several locations.

BACKGROUND

Matriculation exams are conducted in a large space with a plurality of writing locations.

The power supply and data communication connections required for each location in electronic exams are made possible with a portable central processing unit, a so-called electronic telecommunication switchboard, from where the electric and data communication cables are laid to each location in such way that the computer at each location is capable of having power supply and data communication connected thereto.

A problem is the placement of cables on the facility's floor between the locations. Loosely placed cables hinder movement in the space by catching in installation stage and during exams the feet of those moving between the locations.

In order to solve the problem, the cables have been taped securely to the floor for keeping them in place and not tangling at the feet However, the taping has further deterred the installation and dismantling of cables.

SUMMARY

It is one objective of the invention to solve problems of the prior art and to provide a protection cover, which enables a temporary connection of electric and/or data communication to several locations for thereby reducing the possibility of an electric shock as the floor-placed protection cover guards the cables from being possibly stepped on, and facilitating the storage of cables as the cables inside the protection cover can be readily wound along with the protection cover into a storage coil.

The one objective of the invention is attained with a protection cover and system of the independent claim.

According to one embodiment, the protection cover for connecting electric and/or data communication cables to several locations comprises an installation space which enables the installation of cables in the cover. The installation space is defined by a plurality of inter-coupled protection blocks, which are adapted to move relative to each other by means of coupling elements thereof in such a way that the cover lends itself to bending. The protection blocks enable such a connection of cables to several locations that to each location is connected an electric and/or data communication cable.

According to one embodiment, the question is about a system for connecting an electric and/or data communication cable to several locations. The system comprises electric and/or data communication cables each of which comprises coupling elements for connecting the cable to a location, and a protection cover. The protection cover comprises an installation space with cables fitted therein. The installation space is defined by a plurality of inter-coupled protection blocks, which are adapted to move relative to each other by means of coupling elements thereof in such a way that the cover lends itself to bending. The protection blocks enable such a connection of cables to several locations that each location shall have an electric and/or data communication cable connected thereto.

Other embodiments are presented in the dependent claims.

BRIEF DESCRIPTION OF THE FIGURES

The illustrated embodiments will be described with reference to figures as follows.

DETAILED DESCRIPTION OF THE FIGURES

Figure 1A:
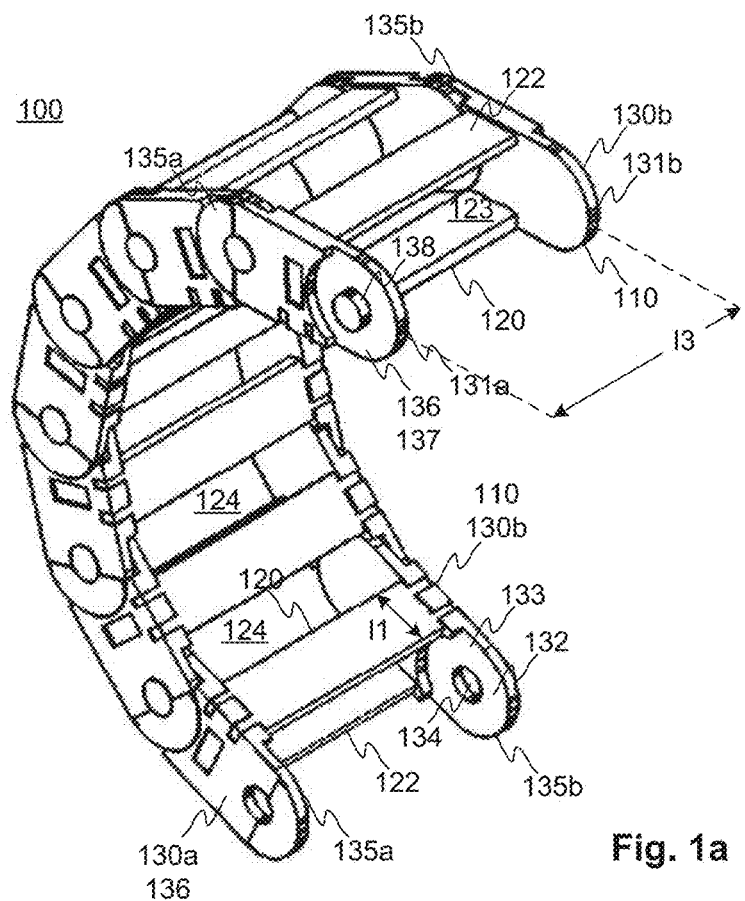
FIGS. 1a-1b show part of a protection cover from different directions
Figure 1B:
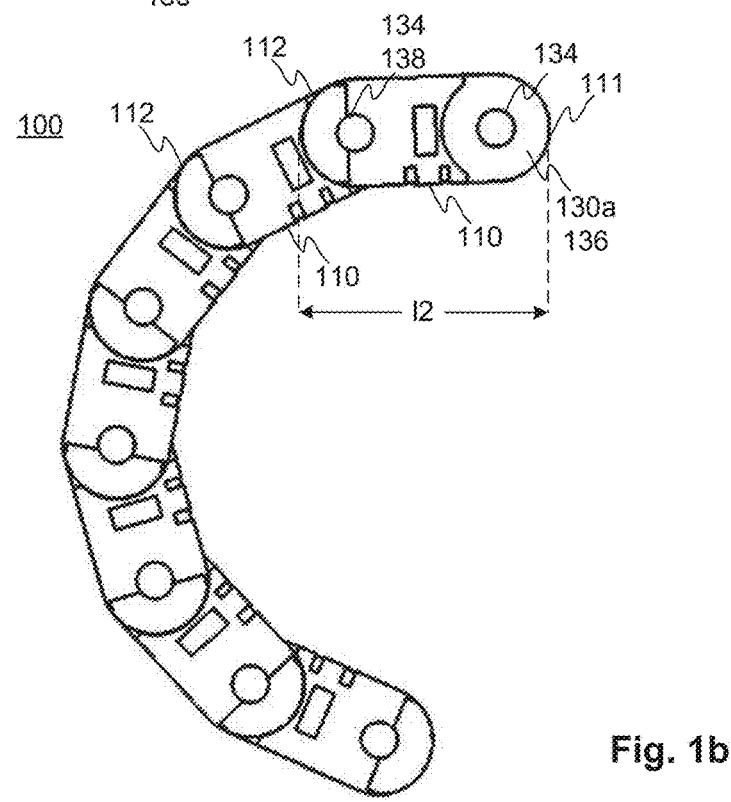

FIGS. 1a-1b present a protection cover 100, which is intended for connecting electric and/or data communication cables 240, 250 to several locations 202, for example to locations for executing matriculation exams or tests, at which students are seated.

The cover 100 comprises a plurality of inter-coupled protection blocks 110, which are movable relative to each other by means of coupling elements 133, 134, 137, 138 thereof in such a way that the cover 100 lends itself to bending.

The blocks 110 enable such a connection of the cables 250, 240 to several locations 202 that each location 202 shall have an electric cable 240 and/or a data communication cable 250 connected thereto.

The blocks 110 can be coupled successively in a lengthwise direction of the cover 100, whereby the blocks 110 make up a track type assembly and the cover 100 deflects in its lengthwise direction to enable coiling of the cover 100, whereby it is easy to uncoil with the cables 240, 250 inside when establishing temporary power supply and communication connections, easy to wind into a coil when dismantling the connections, and to transport and maintain as a coil.

In addition, the cover 100 comprises an installation space 123, which enables installation of the cables 240, 250 in the cover. The space 123 is defined by a plurality of inter-coupled blocks 110.

Each block 110 may comprise a top portion 120, a bottom portion 122, and side portions 130a, 130b which interconnect the substantially parallel top and bottom portions 120, 122, such that thereby is defined a space 123 which protects the cables 240, 250 e.g. from mechanical impacts or depressions. The side portions 130a, 130b are mounted on the ends of the top and bottom portions 120, 122 substantially perpendicularly thereto, such that to the first side portion 130a are attached first ends of the top and bottom portions 120, 122 and to the second side portion 130b second ends of the top and bottom portions 120, 122.

A length l1 of the top and bottom portions 120, 122 lengthwise of the cover 100 is shorter than a length l2 of the side portions 130a, 130b lengthwise of the cover 100, such that at each block are established coupling apertures 124 which enable bringing the cables 240, 250 out of the cover 100 and connecting the same to a location 202.

The elements 133, 134, 137, 138 may comprise outer recesses 133, axle holes 134, inner recesses 137, and stub axles 138.

Each block 110 may have each of its side portions 130a, 130b provided with a hole 134 and a stub 138, whereby the holes 134 of a neighboring block 110, i.e. the one preceding or trailing in a lengthwise direction of the cover 100, are disposed in such a way that the block 110 is able to rotate upon its own stubs 138 in the holes 134 of the neighboring block 110.

The blocks 110 may have its first end 135a, 135b provided with inner recesses 137 and its second end 131a, 131b with outer recesses 133.

Each side portion 130a, 130b can have its first end 135a, 135b, in the inner recess 133 present on an internal surface 132 facing towards the space 123, provided with a hole 134. An external surface 136, facing away from the space 123, in the outer recess 137 present at the second end 131a, 131b of the side portion 130a, 130b, can be provided with a stub 138.

The neighboring blocks 110 can be coupled to each other at the outer recess 137 of a first block 110 and the inner recess 133 of a second block 110.

The blocks 110 can have a length l2 of e.g. 40, 50 or 60 mm and a width l3 of e.g. 40, 60, 80 or 100 mm.

The cover 100 can be constructed from blocks 110 made of plastics.

The cover 100 can be e.g. 10, 15 or 20 m in length.

Figure 2A:
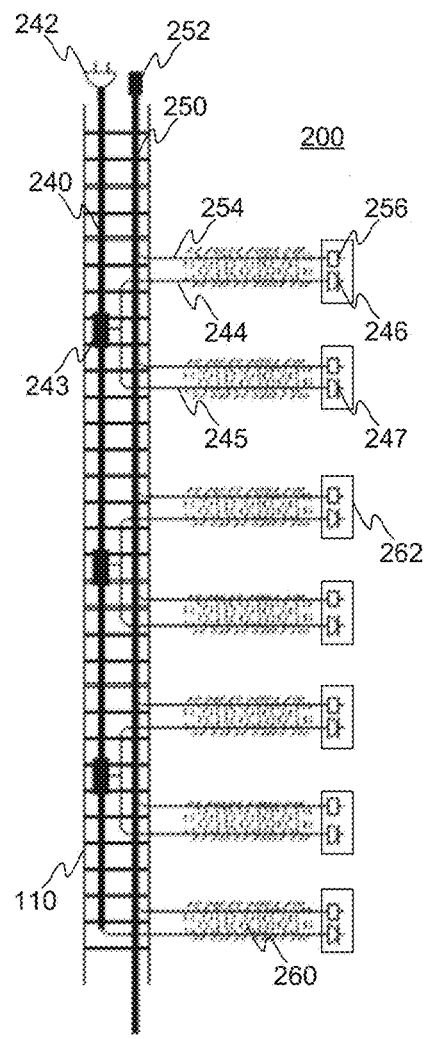
FIGS. 2a-2b show a connecting system which comprises a protection cover and cables, and its deployment in the process of connecting locations

FIG. 2a presents a system 200 for connecting cables 240, 250 to several locations 202.

The system 200 comprises electric cables 240 and/or data communication cables 250 each of which comprises coupling elements 243, 244, 245, 246, 247, 254, 256, 262 for connecting the cable 240, 250 to a location 202.

The system 200 further comprises a cover 100 of the preceding figures.

In addition, the system 200 comprises junction boxes 262 provided with electrical coupling elements 246, 247 for connecting a computer to mains electricity and/or data communication connection means 256 for connecting a computer to a telecommunications network.

The cables 240, 250 are installed inside the cover 100 in a space 123.

The cable 240 can be connected to a portable central processing unit (electric telecommunication switchboard) 204 with coupling elements 242 and distributed to side-by-side locations 202 by means of distribution elements 243 included in the cable 240 by having connection cables 244, 245 emerging from the elements 243 extended out by way of apertures 124 of the cover 100 into the box 262. A computer present at the location 202 can be connected to mains electricity by means of the elements 246, 247 coupled to the cables 244, 245.

The cable 250 can be connected to the unit 204 with coupling elements 252 and distributed to locations 202 by extending distribution cables 254 out by way of apertures 124 of the cover 100 into the box 262. A computer present at the location 202 can be connected to a telecommunications network by means of elements 256 coupled to the cables 254.

The cables 244, 245, 254 can be protected between the cover 100 and the box 262 by means of a shrinkable plastic tube 160, thereby facilitating installation and dismantling of the system 200 as there will be no separate cables 244, 245, 254.

By virtue of the system 200, the cables 240, 250 remain organized and the boxes 262 settle at proper distances from each other, thereby expediting the installation work.

In addition, the cables 240, 250 can be protected between the elements 242, 252 and the cover 100 with a shrinkable plastic tube.

The system 200 may comprise a plurality of boxes 262 functioning as a switching point, e.g. five, six or, as shown in the figure, seven boxes 262.

Figure 2B:
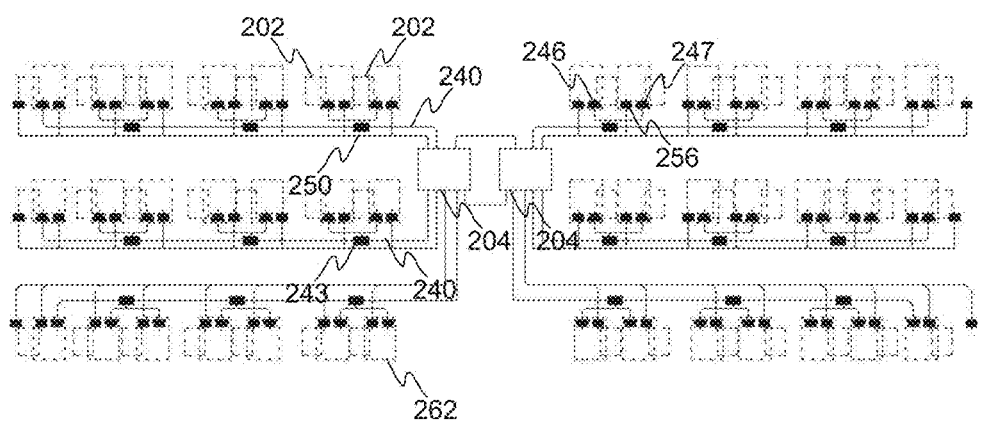

FIG. 2b presents a way of connecting several systems 200 to two parallel units 204.

To the unit 204 can be connected at least one system 200, e.g. one, two or, as shown in the figure, three systems 200.

Each system 200 in the figure enables seven locations 202 to be connected to mains electricity and/or a data communication network, whereby two units 204 and the systems 200 connectable thereto enable 42 locations 202 to be provided with power supply and data communication service connections.

What has been described above represents just a few embodiments of the invention. The principle according to the invention is subject to modifications within the scope of protection defined by the claims, regarding e.g. implementation details as well as fields of use.

The invention claimed is:

1. A protection cover (100) for connecting electric and/or data communication cables (240, 250) to plural locations (202), comprising:
    an installation space (123), formed by a plurality of inter-coupled protection blocks (110), configured to permit installation of cables therein, said protection blocks adapted to move relative to each other by means of coupling elements (133, 134, 137, 138) thereof in such a way that the cover lends itself to bending,
    wherein the protection blocks enable such a connection of cables to plural locations that to each location is connectable an electric and/or data communication cable,
    wherein each of the protection blocks comprises a top portion (120), a bottom portion (122), and opposing side portions (130a, 130b) that interconnect the top and bottom portions, an interior formed by the top portion, the bottom portion and the side portions defining the installation space,
    wherein, for each protection block, the top and bottom portions have a length (l1) that is shorter than a length (l2) of the side portions, such that, at each protection block, coupling apertures (124) are established which enable coupling of cables to a location, and
    wherein, for each protection block of the protection blocks, each side portion has an internal surface (132) and an external surface (136), the inner surface (132) having an inner recess (133) including an axle hole, and the external surface (136) having an outer recess (137) including a stub axle,
    the inner recesses of the side portions of each protection block being positioned at a first end (131a, 131b) of the protection block, and the outer recesses of the side portions of each protection block being positioned at an opposing second end (135a, 135b) of the protection block.

2. The cover according to claim 1, wherein the protection blocks are mounted successively in a lengthwise direction of the cover, and the cover is adapted to bend in the lengthwise direction.

3. The cover according to claim 2, wherein the cover is constructed from plastic.

4. The cover according to claim 1, wherein, for each protection block, axle holes of a neighboring protection block adjacent to the protection block are fitted to the protection block in such a way that the neighboring protection block is able to rotate upon the stub axles of the protection block.

5. The cover according to claim 4, wherein a coupling of adjoining first and second protection blocks is implemented at the outer recesses of the first protection block (110) and the inner recesses of the second protection block (110).

6. The cover according to claim 4, wherein the cover is constructed from plastic.

7. The cover according to claim 1, wherein a coupling of adjoining first and second protection blocks is implemented at the outer recesses of the first protection block (110) and the inner recesses of the second protection block (110).

8. The cover according to claim 1, wherein the cover is constructed from plastic.

9. A system (200) for connecting electric and/or data communication cables (240, 250) to plural locations (202), comprising:

electric and/or data communication cables, each of which comprises coupling elements (243, 244, 245, 246, 247, 254, 256, 262) for connecting to a location; and a protection cover (100) in accordance with claim 1.

\* \* \* \* \*